United States Patent
Fransen (10) Patent No.: US 11,019,160 B2
(45) Date of Patent: May 25, 2021

(54) SEGMENT GENERATION DESCRIBING USAGE PATTERNS

(71) Applicant: Adobe Inc., San Jose, CA (US)

(72) Inventor: Peter R. Fransen, Lehi, UT (US)

(73) Assignee: Adobe Inc., San Jose, CA (US)

(*) Notice: Subject to any disclaimer, the term of this patent is extended or adjusted under 35 U.S.C. 154(b) by 92 days.

(21) Appl. No.: 13/739,986

(22) Filed: Jan. 11, 2013

(65) Prior Publication Data

US 2014/0201351 A1    Jul. 17, 2014

(51) Int. Cl.
*H04L 29/08* (2006.01)

(52) U.S. Cl.
CPC .............. *H04L 67/22* (2013.01); *H04L 67/02* (2013.01)

(58) Field of Classification Search
CPC ......... G06F 17/30867; G06F 17/30864; G06F 15/16; G06F 16/9535; G06F 16/954; G06F 16/955; G06F 16/9558; G06F 16/957; G06F 11/3438; G06F 2201/875; G06F 2221/2119; G06F 40/134; H04L 67/22; H04L 67/02; H04L 67/306; H04L 67/025; H04L 67/10; H04L 67/142; H04L 67/146; H04L 65/601; H04N 21/2407; H04N 21/4782; G06Q 50/01; G06Q 30/02; G06Q 30/0201; G06Q 30/0202; G06Q 30/0277; G06Q 30/0641; G06Q 30/01; G06Q 30/0215; G06Q 30/0239; G06Q 30/241; G06Q 30/243; G06Q 30/0261; G06Q 30/0282; G06Q 20/10; H04W 24/00

USPC .......... 707/E17.108, 758, 706, 709; 709/204–207, 224, 217

See application file for complete search history.

(56) References Cited

U.S. PATENT DOCUMENTS

| | | | |
|---|---|---|---|
| 7,181,438 B1* | 2/2007 | Szabo ................. | G06F 21/6245 |
| 8,660,869 B2* | 2/2014 | MacIntyre et al. .......... | 705/7.11 |
| 2008/0184116 A1* | 7/2008 | Error ................... | G06F 16/4393 |
| | | | 715/704 |
| 2009/0183084 A1* | 7/2009 | Robertson .............. | G06Q 10/06 |
| | | | 715/744 |
| 2009/0216749 A1* | 8/2009 | Hardt ............................... | 707/5 |
| 2010/0015926 A1* | 1/2010 | Luff .................... | H04L 41/0604 |
| | | | 455/67.13 |
| 2010/0161785 A1* | 6/2010 | Xue et al. ..................... | 709/224 |

(Continued)

OTHER PUBLICATIONS

Authors: Hamid Rastegari, Siti Mariyam Shamsuddin, Title "Web Search Personalization Based on Browsing History by Artificial Immune System", Nov. 2010 (Year: 2010).*

*Primary Examiner* — Glenton B Burgess
*Assistant Examiner* — Rachel J Hackenberg
(74) *Attorney, Agent, or Firm* — FIG. 1 Patents (57) ABSTRACT

Segment generation describing usage patterns is described. In one or more implementations, user interaction with a browser is monitored to navigate through a plurality of web pages using a computing device. Data is extracted from web documents associated with the plurality of web pages automatically and without user intervention by one or more modules of the computing device, the data usable to describe a usage pattern involving the navigation through the plurality of web pages. A segment is generated which describes the usage pattern automatically and with user intervention, the segment configured to identify the usage pattern to target content.

20 Claims, 7 Drawing Sheets

(56) References Cited

U.S. PATENT DOCUMENTS

| | | | |
|---|---|---|---|
| 2010/0318426 A1* | 12/2010 | Grant | G06F 17/30864 705/14.66 |
| 2011/0087780 A1* | 4/2011 | McCann et al. | 709/225 |
| 2011/0106796 A1* | 5/2011 | Svaic | G06F 17/30873 707/728 |
| 2011/0185273 A1* | 7/2011 | DaCosta | G06Q 99/00 715/234 |
| 2011/0196821 A1* | 8/2011 | Hellerman | G06F 17/3089 707/600 |
| 2012/0123867 A1* | 5/2012 | Hannan | G06Q 30/0261 705/14.58 |
| 2014/0189519 A1* | 7/2014 | Powell | H04L 67/22 715/736 |
| 2014/0201288 A1* | 7/2014 | Roy et al. | 709/204 |
| 2014/0207872 A1* | 7/2014 | Roy et al. | 709/205 |
| 2017/0109330 A1* | 4/2017 | Alon | G06Q 30/0202 |

* cited by examiner

502
Monitor user interaction with a browser to navigate through a plurality of web pages using the computing device

504
Extract data from web documents associated with the plurality of web pages automatically and without user intervention by the one or more modules of the computing device, the data usable to describe a usage pattern involving the navigation through the plurality of web pages

506
Generate a segment which describes the usage pattern automatically and with user intervention, the segment configured to identify the usage pattern to target content

SEGMENT GENERATION DESCRIBING USAGE PATTERNS

BACKGROUND

Users have access to an ever increasing variety of content that is made available via a network. Users, for instance, may access webpages from a variety of different websites to interact with a wide range of functionality. Further, the ways in which user may access the network is ever increasing, such as from traditional personal computers to mobile devices such as tablets and mobile phones, game consoles, and so on. Consequently, the ways in which users access webpages may vary as greatly as the desires of the users in accessing the webpages.

Because of the ever increasing variety of devices that are used to access this content as well as the differing desires of the users themselves, techniques were developed to enable a provider of a website to monitor usage of the site. This monitoring may be used by the provider to determine which parts of the website were accessed, corresponding revenue generated from parts of the websites, and so on. However, the amount of this data may become unwieldy when attempting to describe the thousands, millions, and even billions of users that may access even a single website. Consequently, it may be difficult using prior techniques to analyze differences in users that access the website, such as differences in how the users interact with the website.

SUMMARY

Generation of segments describing usage patterns is discussed. In one or more implementations, user interaction with a browser is monitored to navigate through a plurality of web pages using a computing device. Data is extracted from web documents associated with the plurality of web pages automatically and without user intervention by one or more modules of the computing device, the data usable to describe a usage pattern involving the navigation through the plurality of web pages. A segment is generated which describes the usage pattern automatically and with user intervention, the segment configured to identify the usage pattern to target content.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

As previously described, a website may be accessed by a wide variety of users in a wide variety of ways. Consequently, techniques were developed in which a service provider may analyze this usage, such as to determine user trends and characteristics of users that may be used to target content to users. However, prior techniques that were used to perform this analysis could be onerous and require specialized knowledge on how to perform the analysis and also what was being analyzed, such as names of particular webpages and so on.

Segment generation techniques are described. In one or more implementations, segments may be generated to describe usage patterns in interaction with one or more webpages. For example, a browser may employ an embedded module that is configured to monitor usage of the browser to access webpages. This monitored usage may be used to extract data from web documents associated with the web pages, such as data usable to describe the particular webpages, functionality of the webpages, and so on. This data may then be used to generate a segment that describes the usage pattern.

In this way, a user may perform navigation in a manner similar to a contemplated visitor to a website to generate a segment that describes this navigation. The segment may then be used in a variety of ways, such as to filter analytics data, target content, expose the segment to receive targeted content, and so on. Further discussion of this functionality may be found in relation to the follow sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
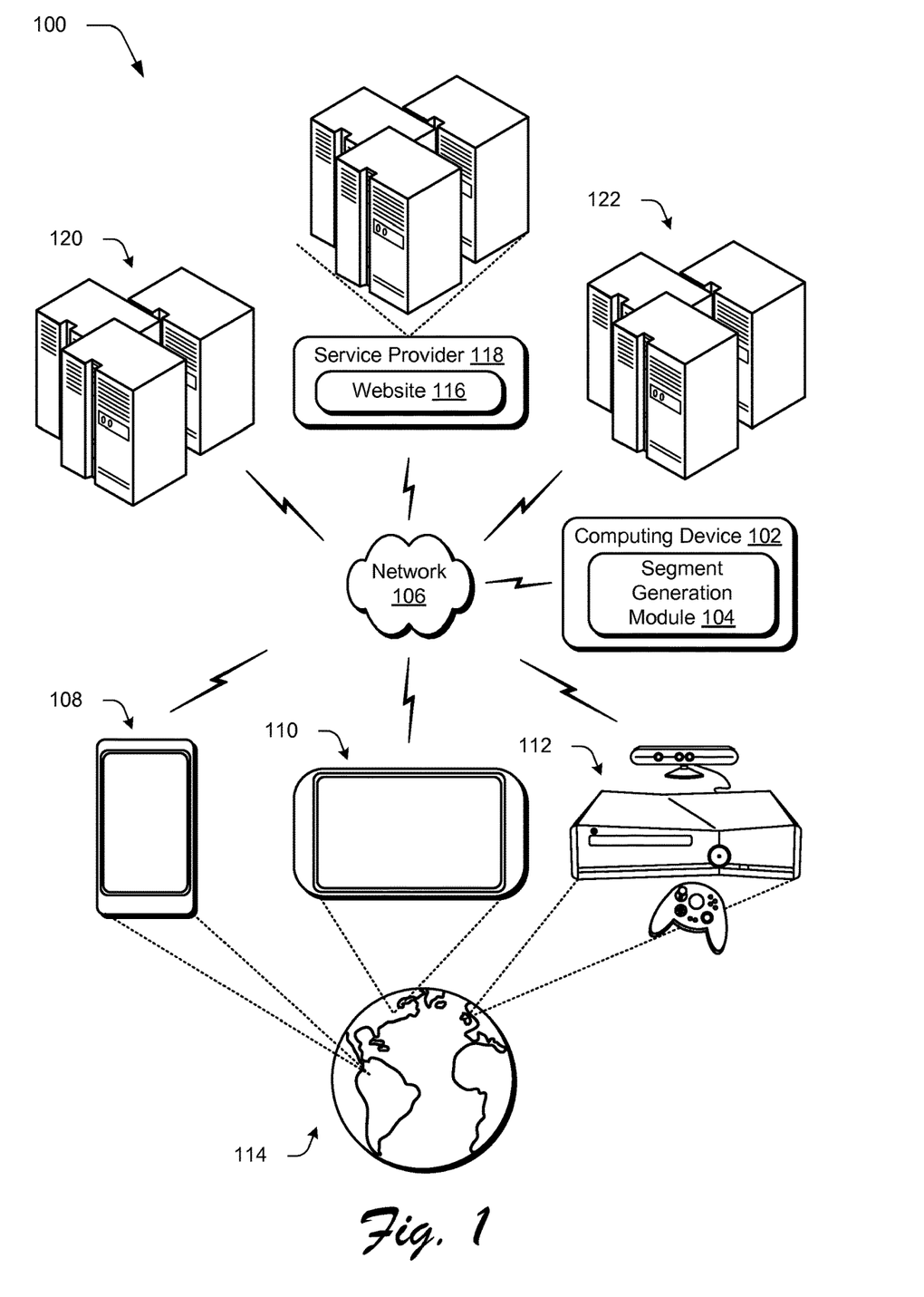
FIG. 1 is an illustration of an environment in an example implementation that is operable to employ segment formation techniques described herein.

FIG. 1 is an illustration of an environment 100 in an example implementation that is operable to employ techniques described herein. The illustrated environment 100 includes a computing device 102 and a segment generation module 104 that are communicatively coupled (e.g., connected) to a network 106. The computing device 102 may be configured in a variety of ways.

The computing device 102, for instance, may be configured as a desktop computer, a laptop computer, a mobile device (e.g., assuming a handheld configuration such as a tablet or mobile phone), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as further described in relation to FIG. 7.

As shown in FIG. 1, for instance, computing devices may assume a variety of configurations to access the network 106, e.g., the Internet. Illustrated examples of which include a mobile phone 108, tablet computer 110, and game console 112 although other examples are also contemplated, such as a desktop PC, laptop, convertible tablet, netbook, electronic reader, portable game device, set-top box, and so forth.

Additionally, this access may be performed from a variety of geographic locations 114, examples of which are illustrated in relation to different parts of the world. Accordingly, this access may be performed at different times of day, involve different languages, dialects, involve geo-political considerations, and so on.

Accordingly, a website 116 exposed by a service provider 118 for access via the network 106 may be accessed by a wide range of different users having a wide range of different computing devices as well as a wide range of desires in accessing the website 116. Further, this access may also involve other websites that are made accessible by other providers, examples of which are shown as service providers 120, 122. In the illustrated instance, the service providers 118-122 are illustrated as being implemented by a plurality of servers, e.g., a server farm. Although illustrated separately, it should be readily apparent that a single server farm (e.g., collection of computing devices) may be used to implement a plurality of websites, multiple server farms may be used to implement a single website, and so on.

Thus, as described above access to the website 116 by the computing devices may be achieved in a variety of different ways. Consequently, techniques were developed in which a service provider 118 may analyze how this access was performed. This may include collecting data that describes the access which may then be analyzed to gain an awareness of the usage of the website 116. For example, data may be collected from thousands and even millions to billions of different users, and therefore may describe a significant amount of interaction performed by these various users.

However, prior techniques that were utilized to analyze this data could be complicated and involve specialized knowledge on the part of the user, e.g., a technician at the service provider 118. For example, the technician may wish to filter the analytical data based on contemplated usage patterns of visitors to the website 116, e.g., users of computing devices 108-112. In prior techniques, the technician was forced to manually describe the usage pattern, including use of particular names for particular webpages, the ordering, and so on. Accordingly, this could involve specialized knowledge of a user interface configured to support these descriptions as well as specialized knowledge of the web pages, devices and software that was utilized to perform this access.

Accordingly, a segment generation module 104 is illustrated that is representative of functionality to generate segments that describe usage patterns involved in access to the website 116. The segment generation module 104, for instance, may be utilized to monitor user interaction and extract data automatically and without user intervention based on this monitoring. The data may then be used to generate a segment that describes the usage pattern. In this way, the segment may describe a persona involved in a specific example of website 116 access and may do so in an intuitive manner, further discussion of which may be found in the following description and corresponding figure.

Figure 2:
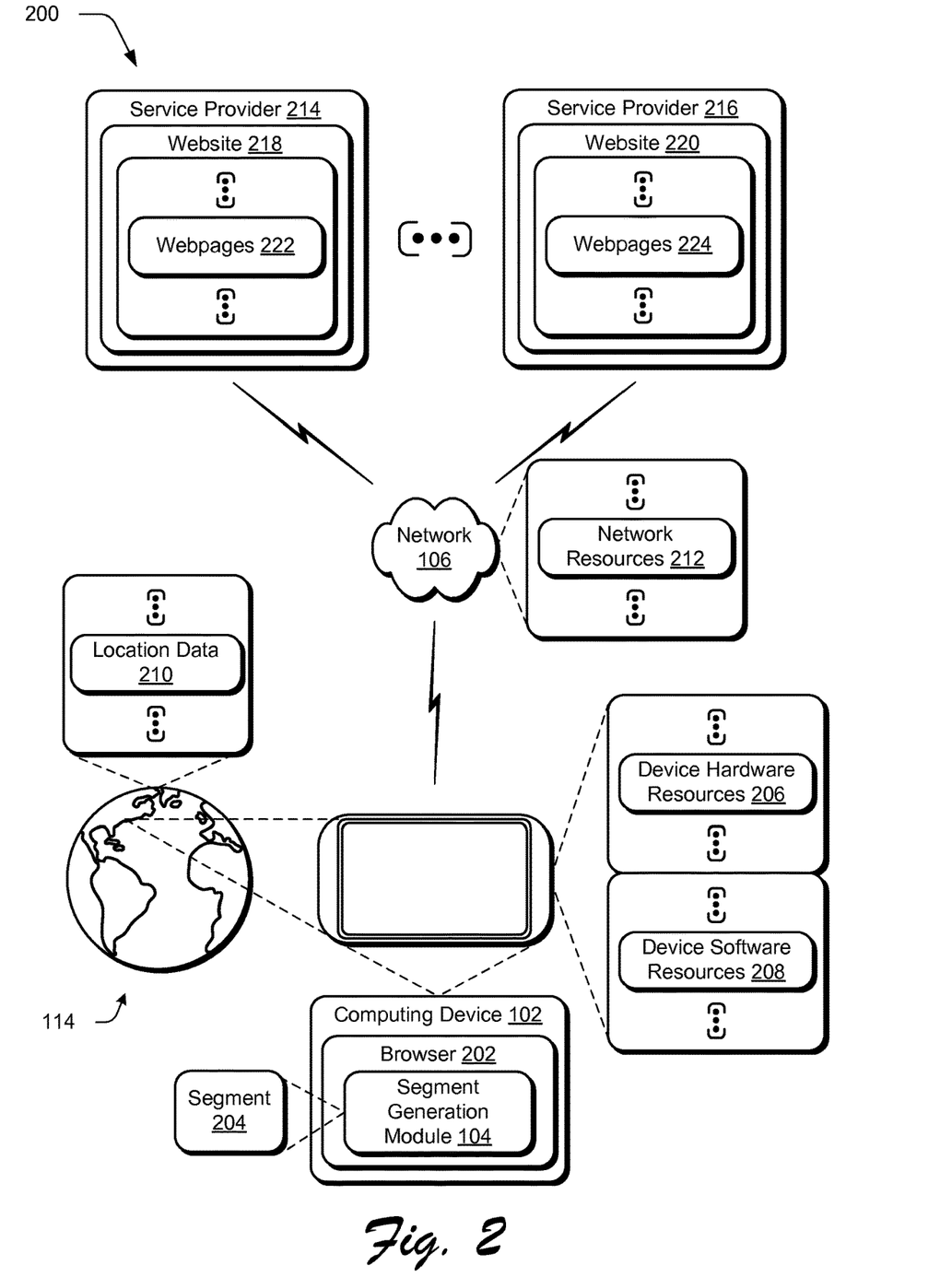
FIG. 2 depicts a system in an example implementation showing a segment generation module embedded as part of a browser to generate a segment describing a usage pattern of website access performed by a computing device of FIG. 1.

FIG. 2 depicts a system 200 in an example implementation showing the segment generation module 104 embedded as part of a browser 202 to generate a segment 204 describing a usage pattern of website access performed by the computing device 102. As previously described, the computing device 102 may be configured in a variety of ways to access the network 106. An illustrated example of which is a tablet computer but other examples are also contemplated as previously described.

The computing device 102 is illustrated as including a browser 202 having an embedded segment generation module 104. The segment generation module 104, for instance, may be configured as part of a third-party plug-in module, coded as part of the browser 202 itself, and so on. The segment generation module 104 as previously described is representative of functionality to generate a segment 204 that describes a usage pattern which may include which websites and webpages with which a user has interacted as well as how that interaction was performed, such as by using particular device, browser, network (e.g., network provider), and so on.

For example, the segment 204 may be configured to describe device hardware and software resources 206, 208. This may include an identification of a type of device, model number, version, manufacturer, hardware components of the device (e.g., processors, memory, graphics, network connection device), housing color, and so on. The device software resources 208 may include identification of software that is involved in interaction described by the usage pattern, such as a manufacturer of the browser 202, version of the browser 202, identification of applications involved in network access such that browser 202 functionality is embedded as part of the application, and so forth.

The segment 204 may also describe a geographic location 114 at which the computing device 102 is located to perform the interaction that is described by the usage pattern. Location data 210, for instance, may include GPS coordinates, a location specified by network 106 towers, identification of a continent, country, state, city, street, or intersection. The location data 210 may also describe whether the access is being performed from a business or home, as well as a language, dialect, and so on associated with the geographic location 114.

The segment 204 may also describe a part of the usage pattern that involves use of a network 106 and network resources 212. This may include a type of network 106, such as wireless or wired, communications protocols and standards employed by the network 106 (e.g., IEEE, 4G, LTE, and so on), identification of a network provider (e.g., wireless provider, cable provider, satellite provider, DSL provider), and so forth.

The segment 204 may also describe a usage pattern of webpages provided by one or more service providers. In the illustrated example, the system 200 includes service provider 214, 216 of websites 218, 220 having respective webpages 222, 224. The usage pattern described by the segment 204 may also include navigation of web pages of a particular website as well as navigation between website 218, 220.

A user, for instance, may be provided a link in a news feed of a social network service supported by the service provider 216. Selection of this link may cause navigation to a webpage 224 of another service provider 216. Thus, in this way the segment 204 may describe a usage pattern that details "how" a user gained access to a website 220 and particular portions of the website 220. Although a few examples of types of data that may be incorporated as part of the usage pattern described by the segment 204 have been described, it should be readily apparent that a wide variety of other examples are also contemplated without departing from the spirit and scope thereof.

The segment 204 may be generated in a variety of different ways. In the illustrated example, the segment generation module 104 is included as part of a browser 202. Accordingly, the segment generation module 104 may be configured to monitor navigation performed by the browser 202 (e.g., through websites 218, 220 over the network 106) as well as how that navigation is performed, e.g., by what configuration of the computing device 102, geographic location 114 of the computing device 102, and so forth.

The segment generation module 104, for instance, may be used to track "where" this navigation occurred by collecting data from webpages (e.g., web documents associated with the web pages) automatically and without user intervention. This may include saving a URL of the webpages 222, 224. This may also include other data that may be obtained to describe user interaction with the webpages 222, 224, such as the portions of the webpages 222, 224 with which the user interacted (e.g., "clicked," viewed, and so on), and how navigation was performed between the webpages, such as through selection of particular links and so forth.

This monitoring may then be used as a basis to form a segment 204 that describes a particular usage pattern. A technician, for instance, may desire to target content to a particular usage pattern. Rather than manually specify the particulars to form the segment 204 (e.g., webpage names, browser type, and so on), the technician may recreate a desired usage pattern which may then cause generation of the segment 204 by the segment generation module 104 to be performed automatically and without user intervention. The segment generation module 104 may also support techniques in which a user may provide inputs via a user interface to also manually specify parts of the usage pattern, such as a particular browser 202, geographic location 114 (e.g., to "spoof" a location without actually traveling there), and so forth. In another example, the information may be obtained automatically based on user interaction, an example of which is described as follows.

Figure 3:
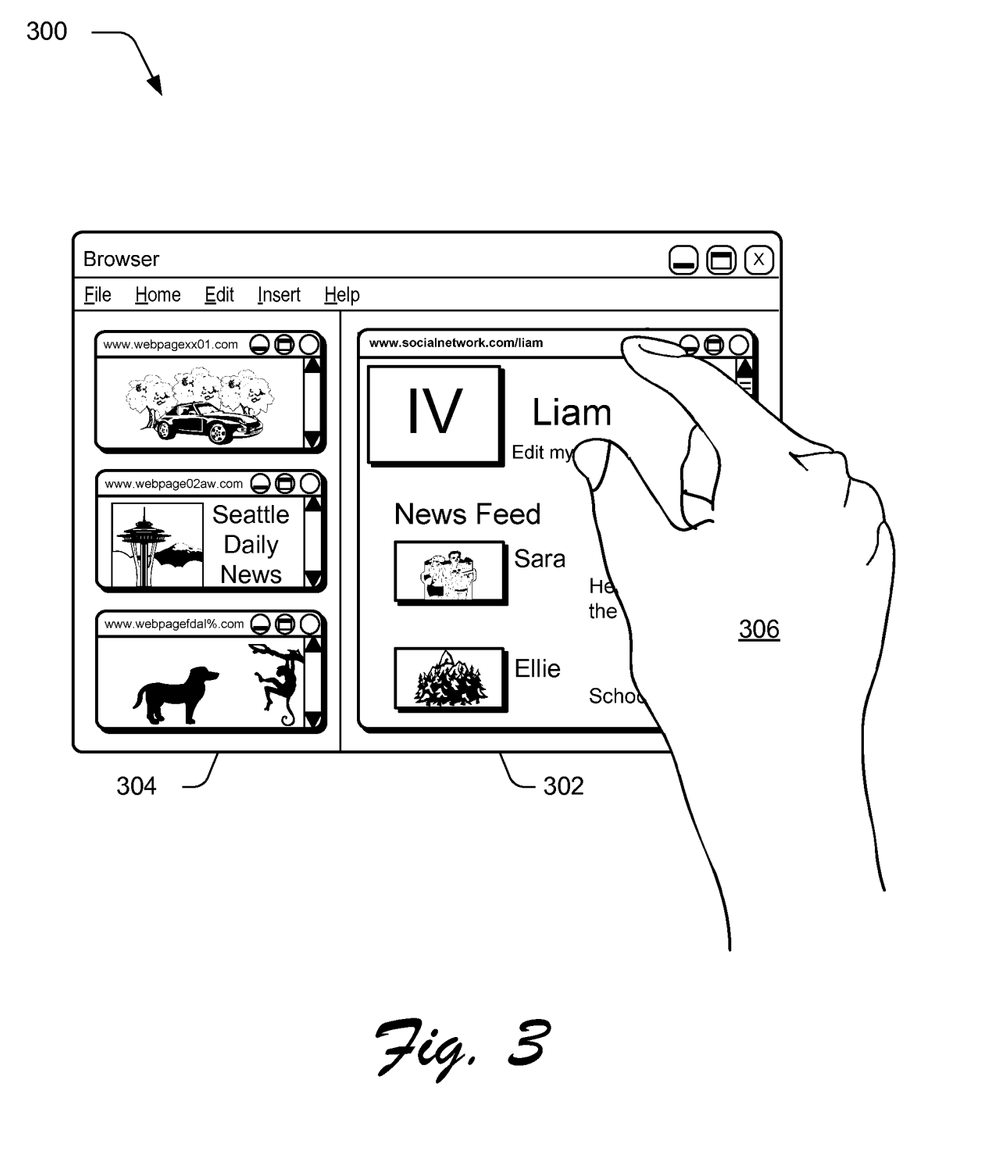
FIG. 3 depicts an example implementation of a user interface that supports user interact to assist in generation of a segment.

FIG. 3 depicts an example implementation of a user interface 300 that supports user interaction to assist in generation of a segment 204. As previously described, a segment generation module 202 may be embedded as part of a browser 202 and used to monitor user interaction in navigating between webpages. In this example, however, a user may specify which parts of the user interaction are to be included as part of a usage pattern to define the segment 204.

For example, the user interface 300 includes first and second portions 302, 304. The first portion 302 includes a current display of a webpage to which a user has navigated using the browser 202. A user may then specify which parts displayed in the first portion 302 are to be described by the segment 202. In the illustrated example, a finger of a user's hand 306 is used to select the currently displayed webpage in the first portion 302 and drag it over into the second portion 304, although other examples are also contemplated such as through use of a cursor control device, voice command, and so on.

The second portion 304 may then include representations of webpages that are to be included as part of the usage pattern. These representations may also support interaction, such as to be arranged and rearranged into a desired order and so forth. In response to this selection, the segment generation module 104 may obtain data automatically and without user intervention from a web document associated with the webpages that describes this interaction.

The web document associated with the webpage, for instance, may include a webpage itself such that data may be obtained that automatically and without user intervention that may be used to uniquely identify the webpage, content of the webpage, and so on. This may also include other data.

A website 218, 220, for instance, may support analytics tracking and therefore have web documents that are associated with webpages to support this tracking. Accordingly, as part of the monitoring of the user interaction with the webpages 222, 224, the segment generation module 104 may make a determination of whether the webpages 222, 224 support analytics tracking. If so, the segment generation module 104 may obtain information from a web document associated with the webpages 222, 224 automatically and without user intervention that may be used to generate the segment 204. Regardless of how the segment 204 is generated, the segment 204 may be used to support a variety of different functionality, an example of which is described as follows and shown in a corresponding figure.

Figure 4:
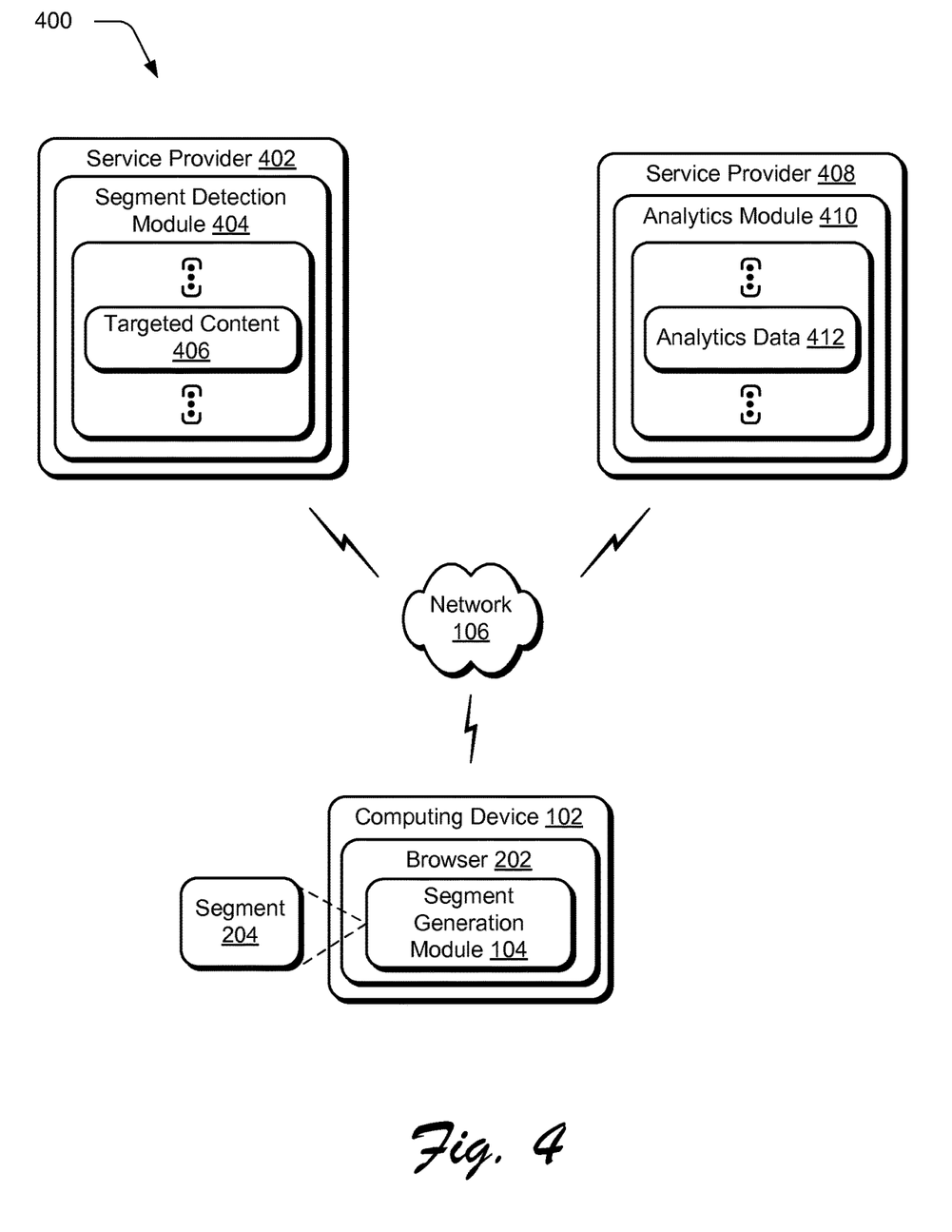
FIG. 4 depicts a system in an example implementation in which a segment generated by a segment generation module is used to support targeting of content and use in conjunction with analytics data.

FIG. 4 depicts a system 400 in an example implementation in which a segment 204 generated by a segment generation module 104 is used to support targeting of content and use in conjunction with analytics data. The system 400 includes the computing device 102 having the browser 202 and segment generation module 104 as previously described that are configured to generate a segment 204. As described above, the segment 204 may be used to support a variety of functionality.

One example of this functionality is illustrated by service provider 402. This service provider 402 includes segment detection module 404 that is representative of functionality to detect the segment 204 generated by the segment generation module 104. For example, the browser 202 of the computing device 102 may be used to navigate to a website provided by the service provider 402. The service provider 402 may then detect a segment 204 exposed by the browser 202 and therefore be made aware of a usage pattern used to generate the segment 204.

Responsive to this detection, the segment detection module 404 may then provide targeted content 406 for consumption by the computing device 102. This may include content recommendations and targeted advertisements, e.g., which may be displayed as part of the webpages. This may also include targeted content 406 that pertains to a configuration of a webpage itself, such as dictate a particular arrangement of content for the webpage, functionality to be included as part of the webpage (e.g., for technical and non-technical users), and so forth. Thus, in this example the segment 204 may be leveraged to describe a usage pattern and target content to particular users associated with that usage pattern.

The segment 204 may also be employed to support analytics. A service provider 408, for instance, may include an analytics module 410 that is representative of functionality to generate and/or analyze analytics data 412. The analytics data 412, for instance, may describe user interaction with web pages 222, 224 of one or more websites 218, 220. As previously described, the amount of data to describe this interaction may be immense in that it may describe millions and even billions of instances of user interaction with a website. Accordingly, it may be difficult using prior techniques to generate a particular segment to describe a usage pattern for use in analysis of the analytics data 412.

However, in the techniques described herein the segment generation module 104 may be used to generate the segment 204 in an intuitive and efficient manner. A user, for instance, may mimic desired behavior of a visitor to a website to generate the segment 204 through use of the segment generation module 104. The segment 204 may then be employed by the analytics module 410 to process the analytics data 412, such as to examine similar usage patterns and associated actions of those usage patterns, such as to determine an amount of revenue of the website that was associated with the pattern. A service provider may then leverage this analysis in configuration of the website for subsequent visitors. A variety of other examples are also contemplated without departing from the spirit and scope thereof.

Example Procedures

The following discussion describes segment generation techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-4.

Figure 5:
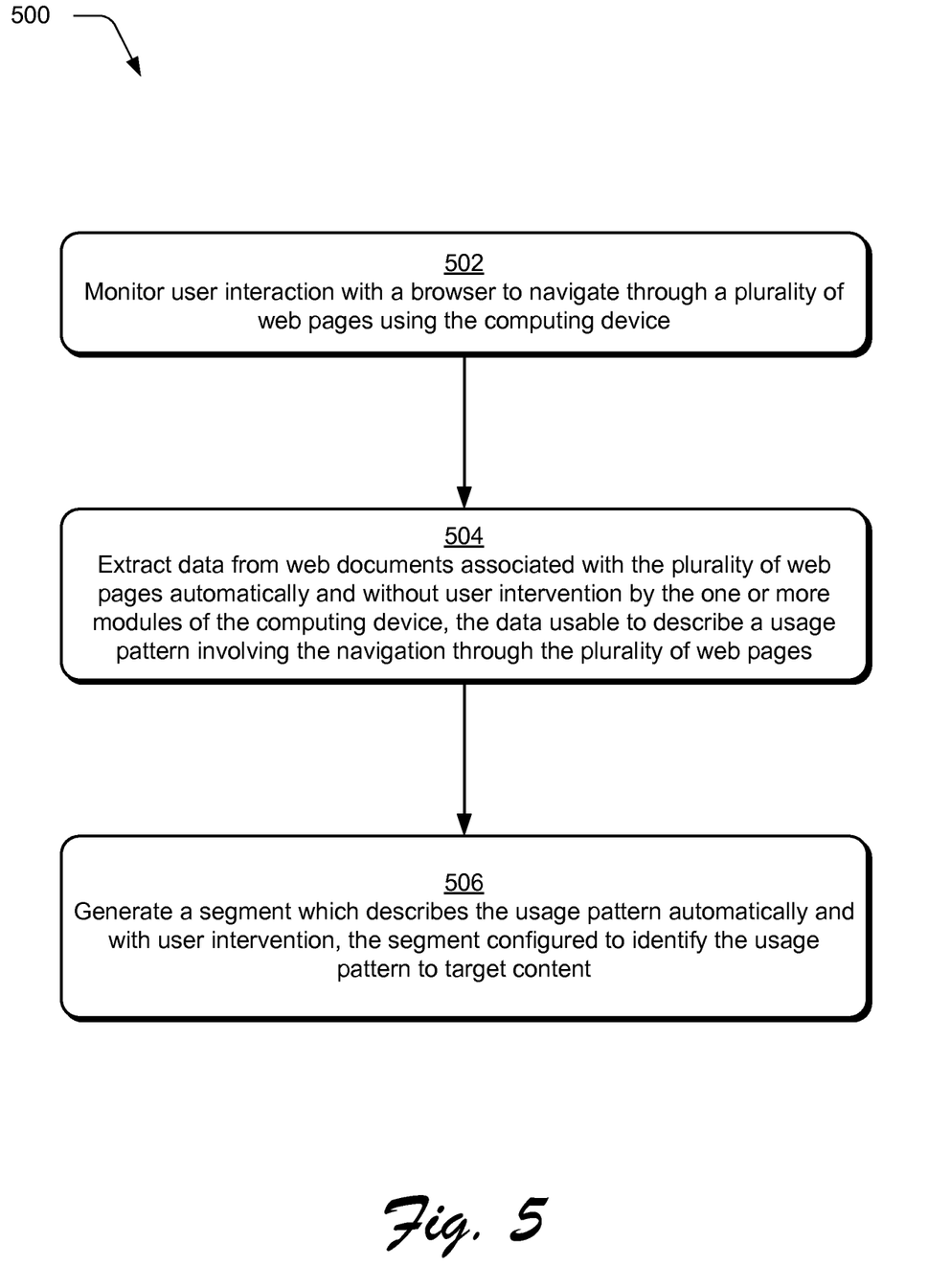
FIG. 5 is a flow diagram depicting a procedure in an example implementation in which user interaction is monitored to generate a segment that describes a usage pattern, the generation performed automatically and without user intervention.

FIG. 5 depicts a procedure 500 in an example implementation in which user interaction is monitored to generate a segment that describes a usage pattern, the generation performed automatically and without user intervention. User interaction is monitored, the user interaction involving a browser to navigate through a plurality of web pages using a computing device (block 502). The browser 202, for instance, may include an embedded segment generation module 104 as previously described to monitor user interaction. This user interaction that is monitored may include identification of device hardware and software resources 206, 208, geographic location 114, network resources 212, identification of webpages 222, 224, and so on.

Data is extracted from web documents associated with the plurality of web pages automatically and without user intervention by the one or more modules of the computing device, the data usable to describe a usage pattern involving the navigation through the plurality of web pages (block 504). The webpages 222, for instance, may support analytics tracking. Accordingly, a segment generation module 104 may be configured to determine if such tracking is supported and if so, extract data from the web documents that is usable at least in part to describe the usage pattern. Other examples are also contemplated, such as an example in which the web document is the content of the webpage itself, examples in which the web document is associated with but is not the corresponding webpage, and so forth.

A segment is generated which describes the usage pattern automatically and with user intervention, the segment configured to identify the usage pattern to target content (block 506). The segment generation module 104, for instance, may generate the segment, which may then be used to target content, such as advertisements, configuration of a webpage itself, and so on. A variety of other examples are also contemplated without departing from the spirit and scope thereof, further discussion of which follows.

Figure 6:
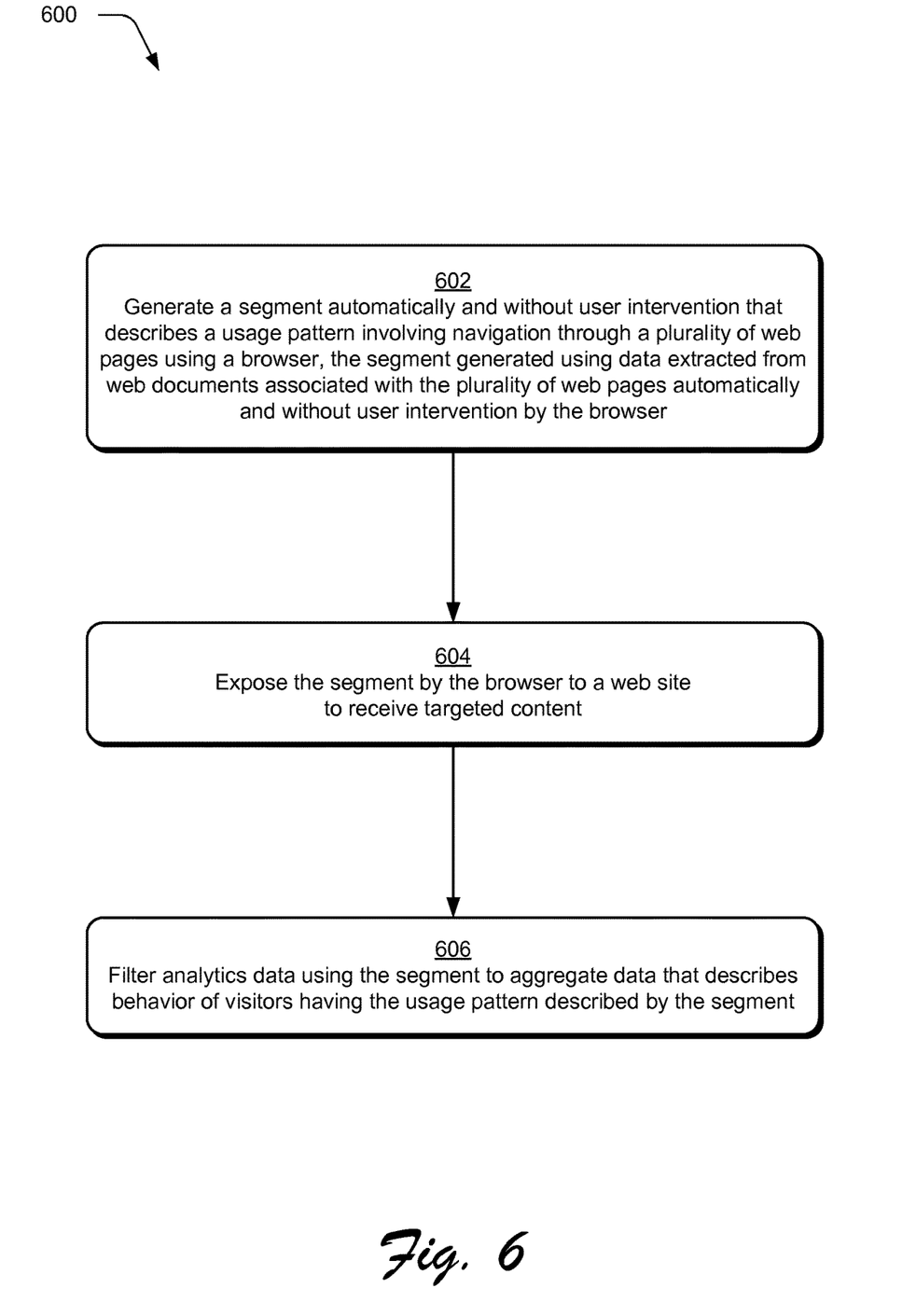
FIG. 6 is a flow diagram depicting a procedure in an example implementation in which a segment is used to target content or part of processing analytical data.

FIG. 6 depicts a procedure 600 in an example implementation in which a segment that was generated automatically without user intervention is leveraged to support a variety of functionality. A segment is generated automatically and without user intervention that describes a usage pattern involving navigation through a plurality of web pages using a browser. The segment is generated using data extracted from web documents associated with the plurality of web pages automatically and without user intervention by the browser (block 602). As previously described, the segment 204 may be generated by the segment generation module 104 without having a user manual specify particulars of the segment, such as names of webpages 222, 224, an order for the webpages, and so on.

The segment is exposed by the browser to a web site to receive targeted content (block 604). The segment 204, for instance, may describe a usage pattern. Accordingly, content may be targeted for that usage pattern, such as advertisements, recommendations, and so on. Other examples are also contemplated.

For instance, analytics data may be filtered using the segment to aggregate data that describes behavior of visitors having the usage pattern described by the segment (block 606). For example, a technician may recreate a desired usage pattern. The segment generation module 104 may then generate a segment that describes the usage pattern, which may then be used to filter the analytics data 412 to locate corresponding data of interest. Other examples are also contemplated.

Example System and Device

Figure 7:
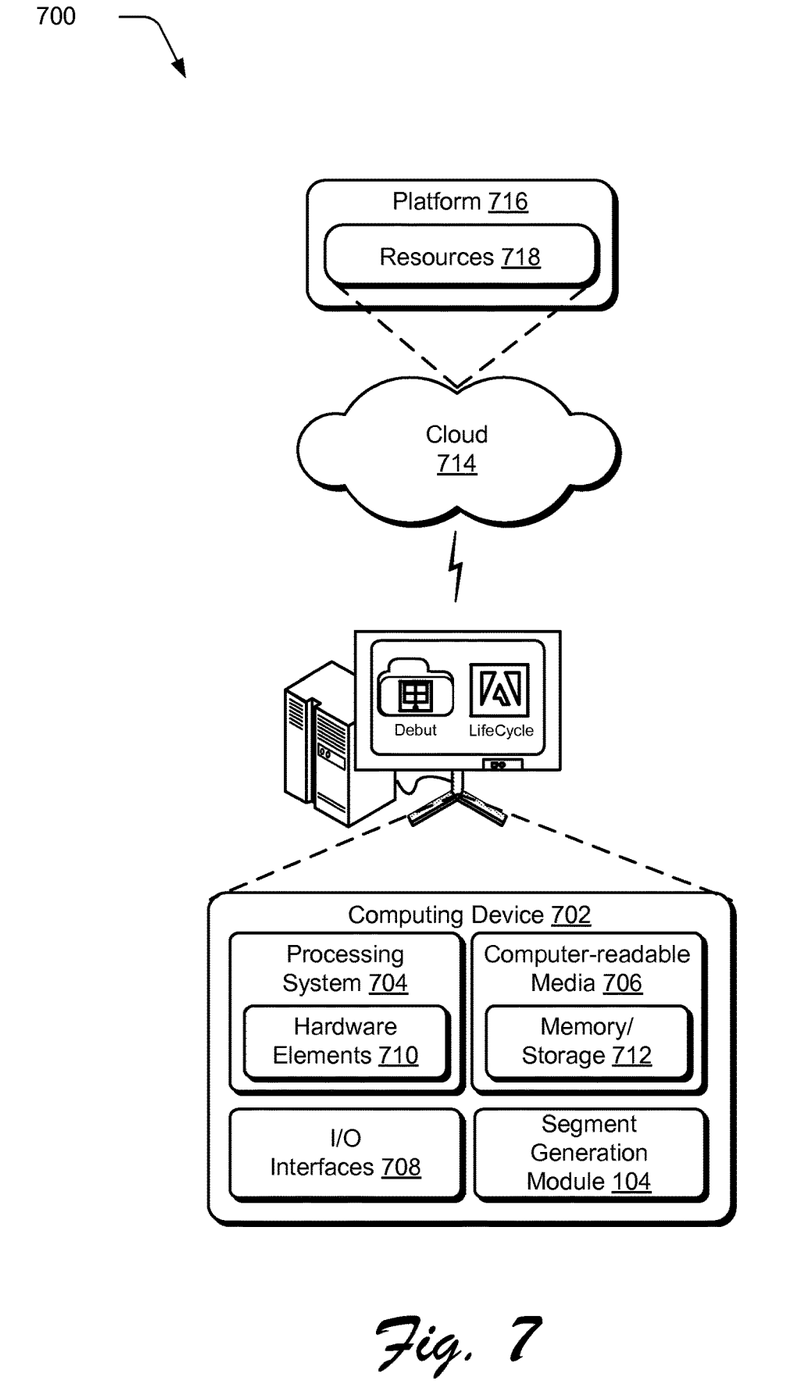
FIG. 7 illustrates an example system including various components of an example device that can be implemented as any type of computing device as described and/or utilize with reference to FIGS. 1-6 to implement embodiments of the techniques described herein.

FIG. 7 illustrates an example system generally at 700 that includes an example computing device 702 that is representative of one or more computing systems and/or devices that may implement the various techniques described herein. This is illustrated through inclusion of the segment generation module 104, which may be configured to generate segments 204 that describe usage patterns. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled (e.g., connected), one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data.

Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method of controlling web page content arrangement, the method implemented at least partially in hardware of a computing device including a processor and a memory device, the method comprising:

monitoring, by the computing device automatically and without user intervention, navigation of multiple visitors through a plurality of web pages of a website, the navigation defining a sequence of actions of the multiple visitors involving a plurality of web pages;

displaying visual indications of multiple web pages of the plurality of web pages in a first region of a graphical user interface (GUI), the visual indications including individual representations of visual content from each web page of the multiple web pages;

receiving user input to the first region of the GUI to select individual visual indications of a subset of web pages of the multiple web pages, and in response moving the visual indications of the subset of web pages to a second region of the GUI;

determining whether the subset of web pages supports analytic tracking;

responsive to the determination that the subset of webpages supports analytic tracking, generating, by the computing device automatically and without user intervention, a usage pattern based on the navigated sequence of actions involving the subset of web pages, the usage pattern further identifying one or more of a wireless communication protocol or a wireless service provider utilized as part of the navigation of the multiple visitors through the subset of web pages;

generating, automatically and without user intervention, a segment based on the usage pattern;

receiving, by the computing device, data describing a usage pattern of a visitor to the website;

determining, by the computing device, the visitor corresponds to the segment by comparing the usage pattern of the segment to the usage pattern of the visitor;

determining that the visitor performs an action to navigate to a web page of the website;

responsive to the determining that the visitor navigates to the web page of the website and corresponds to the segment, dynamically arranging content based on the segment including adding to or subtracting from a set of functional capabilities provided by the web page of the website to the visitor to generate a targeted web page that is targeted to the visitor; and causing the visitor to be navigated to the targeted web page, wherein utilizing the segment to generate the targeted web page increases an efficiency with which the targeted web page is generated and served to the visitor in comparison with conventional service providers.

2. The method as described in claim 1, wherein the generating of the usage pattern is performed automatically and without user intervention from web documents associated with individual web pages responsive to selection, of one or more of the individual web pages.

3. The method as described in claim 1, wherein the generating of the usage pattern is performed, automatically and without intervention, responsive to the navigation by the multiple different users to individual web pages of the subset of web pages.

4. The method as described in claim 1, wherein the generating of the usage pattern includes identifying a geographic location.

5. The method as described in claim 1, wherein the generating of the usage pattern includes identifying hardware and software resources of a computing device that executes the web browser.

6. The method as described in claim 1, wherein the generating of the usage pattern includes identifying network resources of a network used by a computing device that executes the web browser to navigate through the subset of web pages.

7. The method as described in claim 1, wherein the plurality of web pages is provided via a plurality of said websites.

8. The method as described in claim 7, wherein at least one said website is a social network website having a link that is selectable to navigate to another said website.

9. The method as described in claim 1, wherein the content includes targeted advertisements or targeted content recommendations.

10. The method as described in claim 1, wherein the monitoring, the generating a usage pattern, the generating a segment, the receiving data, the determining the visitor corresponds, and the arranging content are performed locally at a computing device that executes the web browser.

11. The method as described in claim 1, wherein the generating of the segment includes identifying a type of network through which access to the plurality of web pages is obtained.

12. The method as described in claim 1, further comprising utilizing the segment to filter analytics data generated as part of the analytic tracking to aggregate behavioral data that describes behaviors associated with the segment, and utilizing the behavioral data as part of said arranging content of the web page to generate the targeted web page.

13. The method as described in claim 1, further comprising utilizing the segment to filter analytics data generated as part of the analytic tracking to aggregate data of interest for inclusion as part of the targeted web page.

14. One or more computer-readable non-transitory storage media comprising instructions stored thereon that, responsive to execution by a computing device, cause the computing device to perform operations comprising:

monitoring, automatically and without user intervention, navigation of multiple visitors through a plurality of web pages of a website, the navigation defining a sequence of actions of the multiple visitors involving a plurality of web pages;

displaying visual indications of multiple web pages of the plurality of web pages in a first region of a graphical user interface (GUI), the visual indications including individual representations of visual content from each web page of the multiple web pages;

receiving user input to the first region of the GUI to select individual visual indications of a subset of web pages of the multiple web pages, and in response moving the visual indications of the subset of web pages to a second region of the GUI;

determining whether the subset of web pages of the website supports analytics tracking;

responsive to the determination that the subset of web pages supports analytics tracking, generating, automatically and without user intervention, a usage pattern based on the navigated sequence of actions involving the subset of web pages;

generating, automatically and without user intervention, a segment based on the usage pattern;

receiving, data describing a usage pattern of a visitor to the web site;

determining that the visitor corresponds to the segment by comparing the usage pattern of the segment to the usage pattern of the visitor;

determining that the visitor performs an action to navigate to a web page of the web site;

responsive to the determining that the visitor navigates to the web page of the website and corresponds to the segment, dynamically arranging content based on the segment including adding to or subtracting from a set of functional capabilities provided by the web page of the website to the visitor to generate a targeted web page that is targeted to the visitor; and  causing the visitor to be navigated to the targeted web page, wherein utilizing the segment to generate the targeted web page increases an efficiency in which the targeted web page is generated and served to the visitor in comparison with conventional service providers.

15. The one or more computer-readable non-transitory storage media as described in claim 14, wherein the arranging content includes advertisements or content recommendations.

16. The one or more computer-readable non-transitory storage media as described in claim 14, the operations further comprising:

receiving additional data that describes the usage pattern of the segment, the additional data including one or more of:

one or more locations from which the multiple visitors access the subset of web pages;

a type of application with which the multiple visitors access the subset of web pages; or   a type of network through which the multiple visitors access the subset of web pages.

17. The one or more computer-readable non-transitory storage media as described in claim 14, the operations further comprising utilizing the segment to filter analytics data generated as part of the analytic tracking to aggregate behavioral data that describes web site navigation behaviors associated with the segment, and utilizing the behavioral data as part of said arranging content of the web page to generate the targeted web page.

18. A system comprising:

means for monitoring, automatically and without user intervention, navigation through a plurality of web pages of a website, the navigation defining a sequence of actions involving a plurality of web pages;

means for displaying visual indications of multiple web pages of the plurality of web pages in a first region of a graphical user interface (GUI), the visual indications including individual representations of visual content from each web page of the multiple web pages;

means for receiving user input to the first region of the GUI to select individual visual indications of a subset of web pages of the multiple web pages, and in response moving the visual indications of the subset of web pages to a second region of the GUI;

means for determining whether the subset of web pages of the website supports analytics tracking;

means for generating, automatically and without user intervention, a usage pattern based on the navigated sequence of actions involving the subset of web pages, and based on a determination that the subset of web pages supports analytics tracking;

means for generating, automatically and without user intervention, a segment based on the usage pattern;

means for receiving, data describing a usage pattern of a visitor to the website;

means for determining, the visitor corresponds to the segment by comparing the usage pattern of the segment to the usage pattern of the visitor; and  means for determining that the visitor performs an action to navigate to a web page of the website;

means for, responsive to the determining that the visitor navigates to the web page of the website and corresponds to the segment, dynamically arranging content based on the segment including adding to or subtracting from a set of functional capabilities provided by the web page of the website to the visitor to generate a targeted web page that is targeted to the visitor; and  means for causing the visitor to be navigated to the targeted web page, wherein utilizing the segment to generate the targeted web page increases an efficiency in which the targeted web page is generated and served to the visitor in comparison with conventional service providers.

19. The system as described in claim 18, wherein the usage pattern involves user interaction with a web browser.

20. The system as described in claim 18, wherein the plurality of web pages is provided via a plurality of said websites.

* * * * *

UNITED STATES PATENT AND TRADEMARK OFFICE
CERTIFICATE OF CORRECTION

PATENT NO. : 11,019,160 B2
APPLICATION NO. : 13/739986
DATED : May 25, 2021
INVENTOR(S) : Fransen Page 1 of 1

It is certified that error appears in the above-identified patent and that said Letters Patent is hereby corrected as shown below:

In the Claims

Column 13, Line 29, Claim 14 after "visitor to the", delete "web site", insert -- website --, therefor.

Column 13, Line 34, Claim 14 after "web page of the", delete "web site", insert -- website --, therefor.

Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*